United States Patent [19]

Kruse

[11] Patent Number: 4,504,362
[45] Date of Patent: Mar. 12, 1985

[54] SOLAR DESALINATION SYSTEM AND METHOD

[76] Inventor: Clifford L. Kruse, 326 S. Myrtle St., Villa Park, Ill. 60181

[21] Appl. No.: 416,383

[22] Filed: Sep. 13, 1982

[51] Int. Cl.³ .............................................. B01D 3/04
[52] U.S. Cl. .......................................... 203/3; 203/1;
203/11; 203/73; 203/100; 203/DIG. 1;
203/DIG. 20; 202/172; 202/180; 202/181;
202/234; 159/1 S; 159/1 SF; 159/DIG. 39
[58] Field of Search ............... 202/234, 181, 173, 172,
202/180, 185 R, 237, 83, 197; 203/10, DIG. 1,
1, 11, 73, DIG. 20, 100; 159/1 SF, 1 S, DIG. 39

[56] References Cited

U.S. PATENT DOCUMENTS

| | | | |
|---|---|---|---|
| 2,424,142 | 7/1947 | Bimpson et al. | 202/234 |
| 2,490,659 | 12/1949 | Snyder | 202/234 |
| 2,803,591 | 8/1957 | Coanda et al. | 202/234 |
| 2,820,744 | 1/1958 | Lighter | 159/1 SF |
| 3,257,291 | 6/1966 | Gerber | 202/234 |
| 3,300,393 | 1/1967 | Fisher | 202/234 |
| 3,357,898 | 12/1967 | Kovich | 202/83 |
| 3,501,381 | 3/1970 | Delano | 203/10 |
| 3,558,436 | 1/1971 | Foley et al. | 202/234 |
| 3,703,443 | 11/1972 | Evans | 202/234 |
| 3,785,931 | 1/1974 | Coffey et al. | 202/234 |
| 3,846,251 | 11/1974 | Hay | 203/10 |
| 4,010,080 | 3/1977 | Tsay et al. | 202/234 |
| 4,172,766 | 10/1979 | Laing et al. | 202/173 |
| 4,219,387 | 8/1980 | Gruntman | 202/234 |
| 4,276,122 | 6/1981 | Snyder | 202/234 |
| 4,302,297 | 11/1981 | Humiston | 203/DIG. 20 |

Primary Examiner—Wilbur Bascomb
Assistant Examiner—Virginia Manoharan
Attorney, Agent, or Firm—Hill, Van Santen, Steadman & Simpson

[57] ABSTRACT

A solar desalination system in which fresh water is derived from sea water by focussing solar ray energy from a collecting reflector onto an evaporator tube located at substantially the focal apex of the reflector. The reflector/evaporator tube assembly is mounted on a horizontal open grid platform which may support a plurality of parallel reflector/evaporator tube assemblies. The reflectors may serve as pontoons to support the desalination system unit on a body of sea water. The solar heat generated vapor is condensed in condenser tubes immersed in the sea water. Intermittently sea water concentrate is withdrawn from the evaporator tubes. Velocity of the vapor passing from the evaporator tubes to the condensers may be utilized for generating power.

22 Claims, 7 Drawing Figures

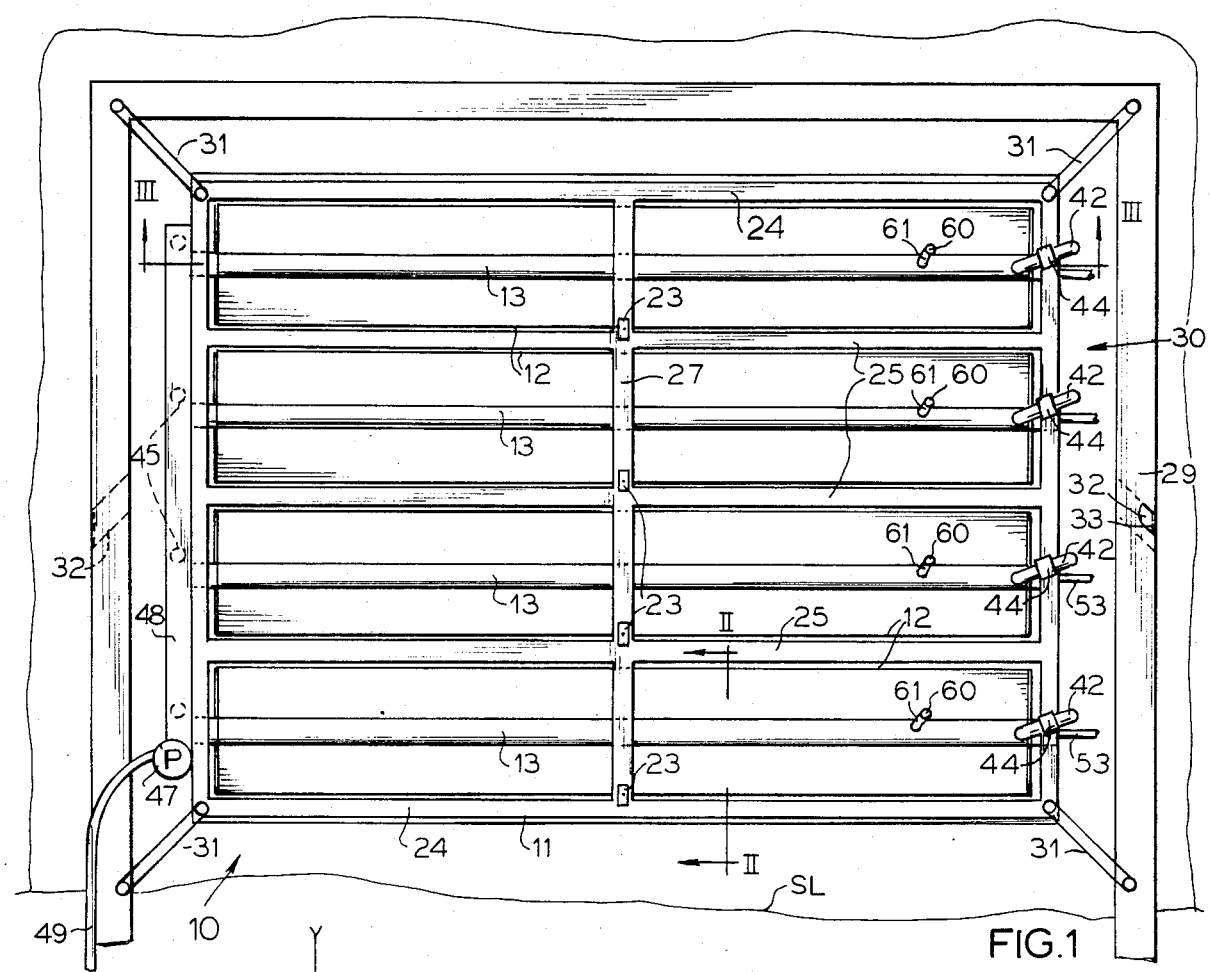
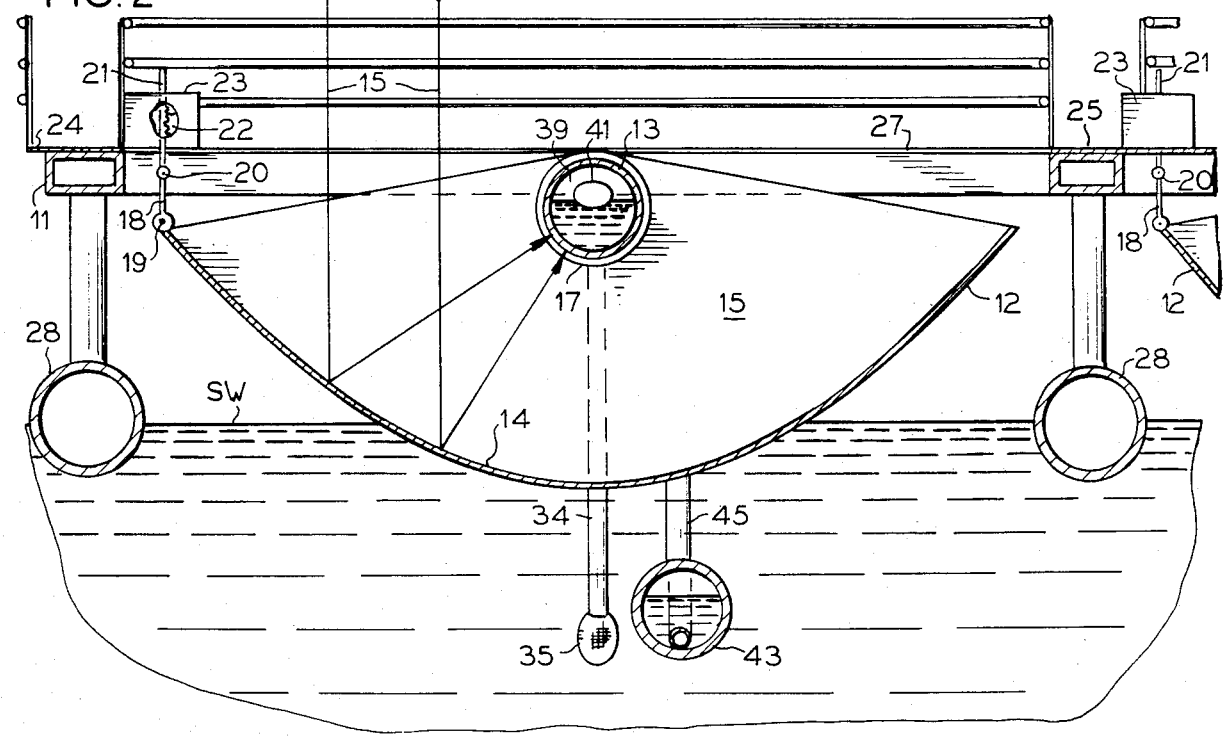

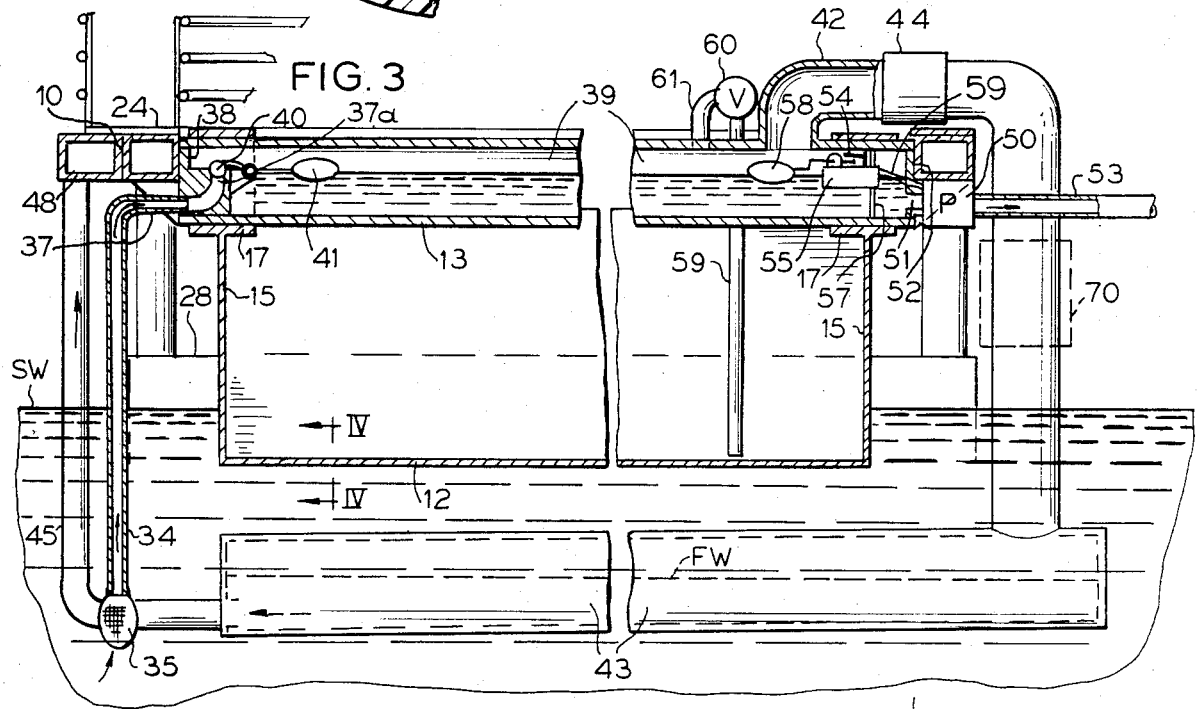

SOLAR DESALINATION SYSTEM AND METHOD

This invention relates to improvements in solar desalination systems, and is particularly concerned with a new and improved system which is adapted to be substantially self-contained and portable.

With the increasing demands for both potable and irrigation water, and in view of the perennial scarcity of water in many areas adjacent to the ocean, considerable effort has been expended heretofore in attempts to convert the ocean or sea water into fresh water by distillation or other evaporative means. In many such areas, there is ample sunshine most of the time. There have been numerous prior proposals to utilize solar energy for effecting sea water conversion. An example of one prior art proposal is found in U.S. Pat. No. 3,257,291 which uses a serpentine land based evaporator duct arrangement. Another prior example is found in U.S. Pat. No. 3,785,931 which provides a small capacity solar still.

There is still much room for improving the technology in solar desalination systems, and in particular to improve the spatial, efficiency and mobility, as well as other characteristics of such systems. The present invention is directed to that end.

Pursuant to the present invention, there is provided in a solar desalination system in which fresh water is derived from sea water, an elongate solar ray collecting reflector, which is adapted for focussing solar ray energy for heating a respective evaporator tube located at substantially the focal apex of the reflector; means for delivering sea water to said evaporator tube; passage means for withdrawing vapor generated in said evaporator tube; means for receiving vapor from said evaporator tube and for condensing the vapor into fresh water, and as an incident to the condensing developing at least some vacuum suction in said passage means toward said receiving and condensing means; means for withdrawing the fresh water condensate from said receiving means; and means for intermittently withdrawing sea water concentrate from said evaporator tube.

The present invention also provides a method of solar desalination for obtaining fresh water from sea water, and comprising focussing solar ray energy from an elongate reflector onto and thereby heating a respective evaporator tube located at substantially the focal apex of the reflector; delivering sea water to the evaporator tube, withdrawing vapor generated in the evaporator tube and condensing the vapor into fresh water in a receiving and condensing means, as an incident to the condensing developing at least some vacuum suction for assisting in withdrawing the vapor generated in the evaporator tube, withdrawing the fresh water from the receiving and condensing means, and intermittently withdrawing sea water concentrate from the evaporator tube.

Other objects, features and advantages of the invention will be readily apparent from the following description of representative embodiments thereof, taken in conjunction with the accompanying drawings, although variations and modifications may be effected without departing from the spirit and scope of the novel concepts embodied in the disclosure, and in which:

FIG. 1 is a top plan view of apparatus providing a substantially self-contained solar desalination system embodying the invention.

FIG. 2 is an enlarged fragmentary sectional detail view taken substantially along the line II—II of FIG. 1.

FIG. 3 is an enlarged fragmental longitudinal sectional elevational view taken substantially along the line III—III of FIG. 1.

FIG. 4 is a fragmentary enlarged sectional detail view taken substantially along the line IV—IV of FIG. 3.

FIG. 5 is a fragmentary sectional detail view similar to FIG. 4 but showing a modification.

FIG. 6 is a fragmentary elevational view, partially broken away and in section, showing a power unit adapted to be utilized with the system of FIG. 3; and FIG. 7 is a sectional elevational view taken substantially along the line VII—VII of FIG. 6.

A solar desalination system 10 (FIG. 1) embodying the present invention is adapted to be constructed as a substantially self-contained unit which may be portable for transportation from place to place as desired. Desirably the unit 10 is constructed as a floating platform and is provided with means adapted to capture solar ray energy over a substantial expanse. To this end, the unit 10 comprises a horizontal open grid platform-like frame 11 which desirably is formed from hollow bars of lightweight material such as aluminum, fiberglass, or the like. In a preferred arrangement the frame 11 is of rectangular shape and is adapted to provide for mounting thereto a parallel array of a plurality of elongate trough-like reflectors 12 and associated respective parallel and substantially coextensive evaporator tubes 13 formed from any suitable material of acceptable heat transfer efficiency.

Each of the reflectors 12 is preferably provided with a generally upwardly facing parabolic reflecting surface 14 designed for efficiently focussing solar ray energy 15 onto the associated evaporator tube 13 which in each instance is located above and at substantially the focal apex of the reflector. Desirably each of the evaporator tubes 13 has opposite closed ends which are fixed to the open frame 10. Each of the reflectors 12 has opposite end walls 15 which are provided at their central upper portions with bearing means comprising coaxial fixed sleeves 17 slidably rotatably engaging the respective end portions of the tubes 13. Through this arrangement, the reflectors 12 are adapted to be adjusted about the axes of the associated evaporator tubes 13 for efficient orientation having regard to the direction from which the solar rays project toward the reflectors in the course of each day. Means are desirably provided for effecting such adjustment of the solar ray collectors or reflectors 12, comprising, for example, linkage means 18 pivotally connected as at 19 to one side of the associated reflector and pivotally connected as at 20 to a vertically movable rack 21 adapted to be reciprocated by means of a pinion 22 driven by a suitable timing mechanism within a cabinet 23. Clock controlled and like timers are available for this purpose. Thereby the attitude of each of the reflectors 12 is adpated to be automatically adjusted to follow the sun during the daily operating interval.

Although for low volume fresh water requirements, a single reflector 12 and associated evaporator tube 13 may be sufficient, generally water requirements are such as to demand maximum practical volume. Accordingly the apparatus as disclosed shows a plurality, in this instance four, of the reflector/evaporator tube assemblies mounted in respect to the frame 11. In the arrangement shown, each of the reflectors 12 may be on the other of sixty to seventy feet in length, providing about ten feet of reflector surface across its width; and the evaporator tube 13 may be about one foot in diameter and slightly longer than the associated reflector 12 in order to accommodate the reflector bearings 17. All sides of the frame 11 desirably provide connected walkways 24. Longitudinally between each pair of adjacent reflectors 12 there may be a crosswalk 25, and extending across the centers of the crosswalks 25 a transverse connecting crosswalk 27 may have the reflector adjusting means within the cabinets 23. Since the tubes 13 are of fairly large diameter and stiff to avoid deflection, they may serve as intermediate or auxiliary under support for the crosswalk 27, if desired. It will be observed that the frame grid defines a plurality of parallel openings at each of which a reflector/evaporator tube assembly is mounted.

By having the reflectors 12 facing upwardly and firmly attached to the frame 11 by means of the evaporator tubes 13, the reflectors are adapted to serve as pontoons for floating the solar desalination system 10 on and above a body of sea water SW (FIGS. 1-3). For additional stability and the avoid sinking of the system apparatus to an undesirable extent should the reflectors become swamped as a result of severe weather conditions, the frame 11 may be provided with auxiliary floatation means such as closed cell pontoons 28. Under normal conditions the auxiliary pontoons 28 may provide additional and stabilizing buoyancy for the platform 11 and associated structure.

If location of the apparatus unit 10 is to be in an area of quiet water, such as a protected lagoon, inlet, harbor or the like, the unit may be anchored freely in the most convenient spot and will rise and fall with the tides but will be free from heavy swells or wave action. On the other hand, if it is necessary to locate the unit 10 in a place where protection against wave action and heavy swells may be necessary, a floating or fixed breakwater 29 may be provided to form an artificial protected lagoon 30 within which the unit 10 can be floated and to which the unit may be tied up as by means of tie lines 31. Conveniently, the breakwater 29 may enclose the lagoon 30 at three sides while the remaining side may be open to a shoreline SL. Underwater access for sea water into the lagoon 30 may be through any preferred passage means such as screened flow holes 32 in the breakwater 29, screens 33 keeping marine animals and flora out of the lagoon 30 if that is a consideration.

Sea water to be converted into fresh water is supplied to each of the closed evaporator tubes 13 through intake means such as an intake duct 34 which has an intake end equipped with a screen 35 extending to a desirable depth into the body of sea water SW. At its upper end, the intake or supply duct 34 has a horizontal leg 37 which communicates through an end closure 38 at one end of the associated evaporator tube 13 with an inlet port 37a located at the elevation within the tube 13 to which a desired level of sea water to be evaporated is adapted to be maintained to leave a substantial headroom space to provide a vapor chamber 39. To avoid overfilling the chamber 39, float controlled check valve means comprising a valve member 40 connected to a control float 41 is provided for closing the inlet port 38 when the water level in the chamber 39 is as high as desired, and for opening the port for replenishing the sea water supply.

As water vapor is generated in each of the evaporator tube chambers 39, the vapor is drawn off, preferably from the opposite end portion of the chamber 39 from the intake 38, through a large cross sectional flow area vacuum duct 42, which directs the water vapor to condenser means immersed in and utilizing the fairly stable cooler temperature of the sea water SW as heat transfer chilling medium. In this instance, the condenser means conveniently comprises a closed end elongate, tubular, efficient heat transfer condenser 43 of preferably larger volume capacity than the associated evaporator 13. The lower end of the vapor duct 42 communicates with one end of the condenser within which the vapor is condensed to fresh water FW. As the vapor condenses and thus greatly shrinks in volume from the vapor phase into the liquid phase, a substantial vacuum is generated in the vapor duct 42 and reflected in the evaporator chamber 39 for drawing the vapor toward and into the condenser 43. Where conditions are such that it may be desirable to provide additional vapor withdrawing vacuum, the vapor duct 42 may, in each instance, be provided with a booster blower fan 44 powered in any suitable fashion such as by means of an electric motor as is customary with this type of fan.

Means for withdrawing fresh water FW from the condenser 43 comprises an upwardly extending takeoff or withdrawal pipe 45 connected to the end of the condenser 43 opposite the end of the condenser into which the vapor duct 42 discharges. Desirably the condenser 43 tilts downwardly toward the lower end of the pipe 45. Positive suction is applied to the withdrawal pipe 45 in any suitable fashion such as by siphon means, individual small pump means, or by means of a common pump 47 (FIG. 1) to draw the water into an accumulator manifold 48 with which the withdrawal pipe 45 from each of the condensers 43 communicates. From the pump 47, the fresh water is pumped through a duct 49 to storage, or point of use, as may be preferred.

In order to maximize solar heat utilization, the sea water within each of the evaporator tubes 13 is maintained as long as practicable in a relatively stagnant condition, except for influx under the control of the float valve 40 and the vacuum in the evaporator chamber 39 by which sea water is sucked in through the port 38 when the valve 40 is opened by drop in the level of the water in the evaporator chamber 39. However, from time to time the salt and mineral content of the residual water in the evaporator 39 will concentrate to the point that it must be flushed out to maintain evaporative efficiency. For this purpose, means are provided including a selectively operable evacuation pump 50 communicating through a port 51 extending through the lower portion of an end closure 52 for the tube 13 opposite to the end closure 38. The pump 50 can be operated to draw the high density sea water concentrate, which may be five to six times the normal density of ordinary sea water, from the chamber 39 and cause discharge thereof through a discharge duct 53 either for return to the sea outside of the breakwater 29, or for delivery to a point where the concentrate may be processed for mineral recovery.

Discharge of the high density mineral laden concentrate through the pump 50 may be effected automatically as needed by water density responsive means such as an automatic electrical control switch 54 (FIG. 3) which is carried by a float 55 riding on the body of water within the evaporator chamber 39 and guided for vertical movement as by means of a guide rod 57. In relatively low density, i.e. normal, relatively unconcentrated, sea water, the float 55 rides low in the water by virtue of a properly selected density ratio relative to the low density water. When the float 55 rides low in the water, a float controlled switch operator 58, of which the float rides on the surface of the water, maintains the switch 54 open. This condition prevails until the switch carrying float 55 rises to a desired elevation when the density of the residual sea water in the chamber 39 reaches a value where it becomes desirable to flush the evaporator. As the float 55 rises due to increased residual sea water density, the switch float 58 which is relatively unaffected by the increased density because it in any event rides high on the water surface, causes the switch operator to swing into switch closing relation and thus automatically activates the pump 50, which is desirably of an electrically motor powered type having an electrical connection 59 with the switch 54. As the flushing motor 50 functions to withdraw the saturated sea water from the evaporator chamber 39, the water level will drop causing the inlet control valve 40 to open and permit an inflow of unsaturated sea water to flush out the saturated water. As the incoming sea water dilutes the water in the evaporator 13, the control float 55 sinks until desirable flushing of the evaporator has been completed, and the switch 54 then opens for automatically terminating the flushing operation.

Inasmuch as the reflectors 12 face upwardly and in effect form trough basins, rain water and possibly airborne sea water during stormy weather may collect in the reflector troughs and must be removed in order to maintain reflector efficiency. To this end, drain-off means are provided comprising for each of the reflectors 12 a suction tube 59 which communicates by way of a shut-off valve 60 with the top of the vapor chamber 39 through a branch duct 61. During normal operation and when there is no need for the suction tube 59 to function, the valve 60 is desirably closed. When there is need to evacuate water collected in the associated reflector 12, the valve 60 is opened, and vacuum in the chamber 39 can cause a suction to draw up and dump the water from the reflector trough into the evaporator tube 13. When the undesired water has been removed from the trough of the reflector, the valve 60 is desirably closed so as to avoid loss of vacuum suction for drawing off vapor from the evaporator chamber 39. This may be effected manually or automatically, as desired.

Each of the reflectors 12 should be of a sea water proof construction. As shown in FIG. 4, such a construction comprises a rugged core 62, which may be metal, of the desired reflector shape, and which includes the end walls 15. On its outer side the reflector core 62 is coated with a protective coating 63 which may be a plastic layer. On its inside surface, the reflector core 62 is provided with a highly reflective surface 64 which, if the core 62 is formed from aluminum may be a highly polished surface of the core itself. On the other hand if the core 62 is formed from steel the inner surface may be treated in a manner to provide a high degree of reflectibility, or polished aluminum foil may be applied. Over the reflector surface 64, a protective coating 65 of a transparent material such as a transparent plastic is applied. From time to time the surface 65 may be scrubbed or flushed down to remove dried salt spray or other smudging foreign matter.

In a modified construction as shown in FIG. 5, the reflector 12' may be molded from a suitable material such as fiberglass. In this case the shell of the reflector 12' may be of semi-circular outline instead of parabolic as in the case of the reflector 12. To attain the same effect as a parabolic reflector surface, the inside surface of the shell body of the reflector 12' is provided with a circumferential series of graduated, longitudinally extending, relatively narrow lens surfaces 67 which will focus solar rays onto the associated evaporator tube 13. Each of the surfaces 67 is desirably provided with a highly reflective finish 68, which may be similar to the finish 64 of the reflectors 12 as described in connection with FIG. 4, or any other suitable reflective finish. If necessary to preserve the finish 68 a preservative transparent coating 69 may be applied over the reflective surfaces.

Where the negative vacuum travel velocity of the vapor is great enough in the vacuum take-off duct 42, whether unaided vacuum generation by operation of the condenser 43, or assisted by the booster fan 44, the velocity may be utilized for generating electricity as, for example, by installing a vapor driven power unit 70 in the vertical leg of the duct 42 as indicated optionally in FIG. 3 and as illustrated in detail in FIGS. 6 and 7. Although the power unit 70 may take other forms, a desirable form comprises a rotary vane device comprising a stator housing 71 providing an expansion chamber 72 within which an eccentric rotor 73 is mounted and equipped with reciprocably slidable vanes 74 running in guide slots 75 and having roller followers 76 running in annular guide track grooves 77 formed in opposite side walls 78 and 79 of the housing 71 and concentric with respect to the circular expansion chamber 72. Since wear is minimal, the housing may be cast in a suitable plastic or molded from any other preferred sea water proof material. The side wall 78 may be formed integrally with the body of the housing 71 while the opposite side wall 79 may comprise a separately formed cover facilitating assembly of the internal components and secured in any suitable fashion as by means of bolts 80.

Within the expansion chamber 72, the rotor 73 is rotatably mounted such that its circular perimeter slidably engages the circular surface defining the expansion chamber 73 at one side of an axial plane through diametrically opposite, respective, flaring inlet mouth 81 with which the upstream connection end of the duct 42 is connected as by means of an attachment collar 82, and a downstream converging exit 83 (allochiral to the entrance 81) and with which the adjacent downstream connection end of the duct 42 is connected by means such as an attachment collar 84.

The rotary mounting of the rotor 73 is by means of a journal 85 at one side supported by anti-friction bearing means 87 mounted in the end wall 78 which may have a bearing housing boss 88 for this purpose. At its oppposite side the rotor 73 has a combined journal and output or driving shaft 89 projecting outwardly from a bearing housing boss 90 and adapted to carry means for driving connection with a generator 91. While there may be a direct gear ratio connection between the shaft 89 and the generator 91, a pulley or sprocket 92 on the shaft 89 may be connected by suitable flexible endless connecting means 93 with a corresponding pulley or sprocket 94 on the shaft of the generator and related in appropriate transmission differential relation to one another. Electricity generated by the generator 91 may be stored in a suitable storage battery 95 connected with the generator. From the battery 95 the stored electricity may be employed to run various motors of the pumps of the apparatus 10, such as motors for the pumps 47 and 50, as well as the motors for the blower fans 44. Although there may be a separate generator for each of the power units 70, all of the power units may be connected for running a single generator, if preferred.

In the preferred arrangement, the apparatus unit 10 is equipped to serve as a floating island. If conditions require, however, or it would be more convenient for use of the unit to have it mounted on a sea bottom carried supporting structure, it will be readily apparent that such an alternative may be adopted. In such event, the condensers 43 must, of course, be located at a suitable elevation below the platform 11, which is supported at a fixed height elevation, to remain immersed at low tide. Furthermore, where conditions are such that preferred mounting of the apparatus unit 10 is on land adjacent to sea water source but normally above sea level, the intake pipes 34 will have to be extended to a suitable distance to remain in an intake relation to the sea water source. Also, if the condensers 43 are to be chilled by sea water temperature they should be located in a position to be immersed in the adjacent sea water body, and the vapor suction ducts 42 and the fresh water pipes 45 must be extended to accomodate the positions of the condensers 43.

It will be understood that variations and modifications may be effected without departing from the spirit and scope of the novel concepts of this invention.

I claim as my invention:

1. In a solar desalination system in which fresh water is derived from sea water:
    an elongate solar ray collecting reflector, which is adapted for focussing solar ray energy for heating a respective evaporator tube located at substantially the focal apex of the reflector;
    means for delivering sea water to said evaporator tube;
    means for controlling said means for delivering sea water and adapted for maintaining a predetermined level of the sea water to be evaporated within said evaporator tube so as to provide for vapor chamber space above the water in the tube;
    passage means for withdrawing vapor generated in said evaporator tube;
    means for receiving vapor from said evaporator tube and for condensing the vapor into fresh water, and as an incident to the condensing developing at least some vacuum suction in said passage means toward said receiving and condensing means;
    means for withdrawing the fresh water condensate from said receiving means;
    means for intermittently withdrawing sea water concentrate from said evaporator tube;
    and a water density responsive means in contact with the sea water in said evaporator tube and responsive to the density of such sea water for controlling said means for intermittently withdrawing sea water concentrate.

2. A system according to claim 1, wherein said passage means has a booster blower fan for accelerated withdrawal of vapor from said evaporator tube and delivery of the vapor to the receiving and condensing means.

3. A system according to claim 1, including a rotary vane power unit in said passage means and adapted for operation by the velocity of vapor traveling through the passage means, said power unit comprising a rotary device having an output shaft adapted to be connected with means to be operated by said power unit.

4. A system according to claim 1, including a horizontal frame mounting said reflector and evaporator tube as an assembly, and said reflector being rotatably adjustable about the axis of the evaporator tube.

5. A system according to claim 4, wherein said frame provides an open grid of walkways defining a plurality of parallel openings, a reflector/evaporator tube assembly mounted at each of said openings.

6. A system according to claim 1, including a horizontal frame to which said reflector and evaporator tube are mounted as an assembly, said reflector comprising a closed end trough and being adapted to serve as a pontoon for floatingly supporting said frame and assembly on a body of sea water.

7. A system according to claim 1, wherein said reflector is in the form of an upwardly facing closed end trough, and means for withdrawing water that may collect in the trough.

8. A system according to claim 1, wherein said means for withdrawing sea water concentrate from said evaporator tube comprises a pump at one end of said evapoarator tube, and said water density responsive means is connected to said pump and comprises a sea water concentrate density responsive float riding on the sea water in said tube adjacent to said pump.

9. A system according to claim 1, including means for maintaining said reflector above a body of sea water, and said means for receiving and condensing vapor comprising an elongated condenser tube located longitudinally below said reflector for heat transfer immersion in the body of sea water, said passage means being connected to one end portion of said condenser tube, and said means for withdrawing the fresh water condensate being connected to the opposite end portion of said condenser tube and comprising a pipe extending upwardly to an accumulator adjacent to said reflector.

10. A method of solar desalination for obtaining fresh water from sea water, and comprising:
    focussing solar ray energy from an elongate reflector onto, and thereby heating, a respective evaporator tube located at substantially the focal apex of the reflector;
    delivering sea water to the evaporator tube;
    maintaining a predetermined level of the sea water to be evaporated within said evaporator tube and thereby providing a vapor chamber space above the water in the tube;
    withdrawing vapor generated in the evaporator tube and condensing the vapor into fresh water in a receiving and condensing means;
    as an incident to the condensing developing at least some vacuum suction for assisting in withdrawing the vapor generated in the evaporator tube;
    withdrawing the fresh water from the receiving and condensing means;
    and responsive to a water density responsive means in contact with the sea water in said tube, determining increases in density of such sea water and intermittently withdrawing sea water concentrate from the evaporator tube.

11. A method according to claim 10, comprising applying vacuum suction to the evaporator tube in addition to the vacuum suction effected by the condensing of the vapor.

12. A method according to claim 10, which comprises effecting vapor velocity in passage means extending from said evaporator tube to said receiving and condensing means, and in said passage means driving a rotary vane power unit responsive to the vapor velocity and thereby operating an output shaft connected to means for utilizing the power thus developed.

13. A method according to claim 10, comprising providing a horizontal frame in the form of an open grid of walkways defining a plurality of parallel openings, and mounting one of said reflector and evaporator tube at least in part below said walkways at each of said openings.

14. A method according to claim 10, which comprises mounting said reflector and evaporator tube as an assembly to a horizontal frame, and utilizing said reflector as a pontoon and thereby floatingly supporting said frame and assembly on a body of sea water.

15. A method according to claim 10, which comprises providing said reflector in the form of an upwardly facing closed end trough, and withdrawing water that may collect in the trough.

16. A method according to claim 10, wherein said withdrawing of sea water concentrate is effected through a pump at one end of said tube, and controlling operation of said pump by means of said water density responsive means riding on said sea water in said tube and responsive to sea water concentrate density in said evaporator tube.

17. A method according to claim 10, comprising mounting said reflector and associated evaporator tube above a body of sea water, effecting said condensing in a condenser tube located below said reflector and immersed in the body of sea water, delivering vapor from said evaporator tube into one end of said condenser tube, withdrawing the fresh water from the opposite end of the condenser tube, and delivering the withdrawn fresh water to an accumulator adjacent to said reflector.

18. In a solar desalination system in which fresh water is derived from sea water:
a supporting frame;
an elongated evaporator tube mounted horizontally on said frame;
means for delivering sea water to be evaporated into one end of said tube and including means for controlling the depth of sea water in the tube to a limited depth so as to maintain a substantial vapor chamber space above the water in the tube;
a solar ray collecting reflector of substantially the same length as said tube and located below the tube and adapted for focusing solar ray energy at the focal apex of the reflector onto the bottom of the tube for heating the sea water in the tube for generating vapor in said vapor chamber space;
means for withdrawing vapor from said vapor chamber space and for condensing the vapor into fresh water, and as an incident to the condensing developing at least some vacuum suction in said passage means toward said receiving and condensing means;
means at the opposite end of said tube for intermittently withdrawing sea water concentrate from the body of water in said tube; and means for withdrawing the fresh water from said receiving and condensing means.

19. A system according to claim 18, wherein said frame comprises a platform providing walkways for access to said tube and reflector, and pontoons on a lower portion of said frame for supporting the frame on a body of sea water.

20. A system according to claim 19, wherein said platform is of a size to accommodate a plurality of said evaporator tubes and associated reflectors, means mounting said evaporator tubes and associated reflectors in spaced parallel relation on said platform, and said platform comprising walkways along the ends of said tubes and associated reflectors, and connecting walkways between said end walkways and located alongside said tubes and associated reflectors and leaving space above said tubes and associated reflectors free for reception of solar rays.

21. A system according to claim 19, including a breakwater extending about said pontoon equipped frame and of a size to accommodate said frame floatingly in a protected lagoon within the breakwater, and means for anchoring the frame in spaced relation to the breakwater.

22. A system according to claim 21, wherein said breakwater has screened flow holes therethrough for permitting sea water surrounding the breakwater to enter said protected lagoon.

* * * * *